April 12, 1966 A. G. LLOYD 3,246,229
POWER SUPPLY SYSTEM USING A CHOKE INPUT FILTER
AND HAVING IMPROVED REGULATION
Filed Feb. 12, 1962 4 Sheets-Sheet 1

INVENTOR.
ALLAN G. LLOYD
BY John A. Harvey
ATTORNEY

INVENTOR.
ALLAN G. LLOYD
BY John A. Harvey
ATTORNEY

April 12, 1966

A. G. LLOYD 3,246,229

POWER SUPPLY SYSTEM USING A CHOKE INPUT FILTER
AND HAVING IMPROVED REGULATION

Filed Feb. 12, 1962

INVENTOR.
ALLAN G. LLOYD
BY
John A. Harvey
ATTORNEY

INVENTOR.
ALLAN G. LLOYD
BY John A. Harvey
ATTORNEY

United States Patent Office 3,246,229
Patented Apr. 12, 1966

3,246,229
POWER SUPPLY SYSTEM USING A CHOKE INPUT FILTER AND HAVING IMPROVED REGULATION
Allan G. Lloyd, Newark, N.J., assignor, by mesne assignments, to McGraw-Edison Company
Filed Feb. 12, 1962, Ser. No. 172,448
18 Claims. (Cl. 321—10)

The present invention relates to unidirectional power supply systems and, particularly, to such systems in which an alternating voltage is rectified and the rectified voltage then filtered to provide a unidirectional output voltage substantially free of significant voltage pulsation.

Power supplies, having a rectifier system utilizing one or more rectifier devices energized by alternating current, operate to energize a resistive load with a load current which although unidirectional does not have constant amplitude but rather flows in pulses. It is accordingly conventional to interpose filter networks between the rectifier system and the load to remove the pulsations from the load current and voltage. These filter networks usually include series inductors and shunt condensers, the shunt condensers tending to maintain a substantially constant value of voltage across their terminals and the series inductors tending to maintain the current through the inductor of constant value. Together these filter elements tend to prevent the large pulsations in current and voltage appearing at the output of the rectifier system, or input to the filter network, from reaching the output terminals of the filter network. These filter networks may be either the capacitive input form having an input shunt-connected filter condenser or the inductive input form having an input series-connected filter inductor.

For certain applications, power supply systems using inductive input filter networks are preferred for several reasons. As compared to the capacitive input filter network, the inductive filter network enables the power supply system to exhibit improved output voltage regulation over a wide range of output load current values, to have decreased percentage ripple factor with increased values of output load current, and generally to require smaller values of peak current flow through the rectifiers and energizing transformer for any given value of load current. There is, however, the well known disadvantage in using the inductive-input form of filter network that the output voltage of the network rises rapidly whenever the load current decreases below a given value dependent upon the particular value of inductance of the input filter inductor or, conversely, whenever the input inductor has insufficient inductance for a given minimum value of load current. The reason for this rise in the output voltage is due to cessation of current flow through the inductor for at least a portion of each half cycle of the alternating current energizing source. This condition may occur with normal changes of output load required to be supplied by the power supply system, and the permissive range of load changes is progressively reduced with decreasing values of inductance of the input filter inductor. Upon sufficient decrease of the value of output load or accidental removal of the output load altogether, excessive rise of the output voltage may result in voltage break-down failure of filter condensers and this in turn may lead to destruction of rectifier devices or other power supply components.

There have heretofore been several proposed solutions advanced to avoid the excessive voltage condition last described. One such solution contemplates that the input inductor be designed to have a very large value of inductance, but this requires an inductor of expensive construction and large physical size and tends to impair the voltage regulation characteristic of the power supply system by excessive resistive voltage drop through the inductor. Another of the proposed solutions contemplates the use of a resistor permanently connected across the output circuit of the power supply system and having a value of resistance sufficient to insure that a minimum value of load current is always drawn from the power supply system. This proposal, of course, is undesirable from the standpoint that this shunt-connected resistor creates an ever present power loss and thus undesirably reduces the efficiency of the system. A further proposed solution is particularly concerned with operating conditions normally requiring that the load current vary over a relatively wide range of values and contemplates the use of an input filter inductor of the swinging choke type. This inductor has a construction such that its incremental inductance decreases appreciably with an increase in the load current so that its reduced value of inductance at full load current provides satisfactory filtering action, while the increase of inductance at low values of load current enables a lower value of load current to be attained without excessive output voltage rise. In this instance, the shunt resistor used across the output circuit of the power supply system to insure the flow of minimum load current may have a larger value of resistance and thereby decrease the undesirable power dissipation of this resistor.

It is an object of the present invention to provide a new and improved unidirectional power supply system and one which exhibits the excellent regulation characteristic of inductance-input filter networks over the full range of load currents from zero load current to maximum load current supplied by the system.

It is a further object of the invention to provide an improved unidirectional power supply system having an inductive input type of filter network and one which entirely avoids any requirement that a minimum value of load current flow, or that any minimum value of filter inductance be used, to avoid undesirable rise of the output voltage of the system to a value in excess of the average value of alternating voltage rectified.

It is an additional object of the invention to provide a novel unidirectional power supply system wherein the voltage regulation characteristic of the system is determined, for all values of load current including zero value of load current, almost entirely by the input power transformer effective resistance and leakage inductance, by the rectifier conductive resistance, and by the resistance of the filter inductor or inductors, and thus one having minimized undesirable power loss with consequent enhanced efficiency of operation.

Other objects and advantages of the invention will appear as the detailed description thereof proceeds in the light of the drawings forming a part of this application and in which.

The unidirectional power supply system of FIG. 1 embodies the present invention in a form wherein a filter input network of the choke input type is preceded by a shunt-connected controlled-conductance device permitting current to flow bi-directionally through the input filter choke whenever the output unidirectional load current falls below a preselected minimum value. The supply includes an input power transformer 10 having a primary winding 11 energized from a source of alternating current, not shown, connected to input terminals 12 and having a center-tapped secondary winding 13. The end terminals of the secondary winding 13 are connected for full-wave rectification through diode rectifier devices 14 and 15 to a filter network shown, for simplicity, as a single filter stage having an input series filter choke 16 and output shunt-connected filter condenser 17. A power supply output circuit has terminals 18 and 19 to which a load device, shown in broken lines 20, may be connected for energization with unidirectional power.

For reasons presently to be explained more fully, the filter network 16, 17 is preceded by a shunt-connected controlled-conductance device shown by way of example as comprised by a transistor 21 having an emitter electrode 22 connected to the junction of the rectifier devices 14 and 15 and having a collector electrode 23 connected to the negative side of the power supply output circuit as shown. The transistor 21 also includes a base electrode 24 which is connected through a resistor 25 to the collector electrode 23, a bias potential of full-wave rectification waveform being developed across the resistor 25 by bias diode rectifier devices 26 and 27 connected to the end terminals of the transformer secondary winding 13 as shown.

In considering the operation of the unidirectional power supply system just described, its operational characteristics will first be considered under the assumption that the transistor 21 is removed from circuit. Upon energization of the transformer primary winding 11 from an alternating current power supply source, not shown, a voltage $E_1$ of sinsoidal waveform is developed across the transformer secondary winding 13 as graphically represented by FIG. 2a. The unidirectional voltage $E_2$ developed at the input of the filter network 16, 17 by operation of the diode rectifier devices 14 and 15 is of full-wave rectification waveform as graphically represented by the solid line curve of FIG. 2b. The average value of this unidirectional voltage is represented in FIG. 2b by the horizontal broken line $E_0$ for the assumed condition that the unidirectional load current flowing to the load device 20 is sufficiently large in relation to the value of inductance of the filter choke 16 that current flows at all times through the choke 16. For the operating condition last mentioned, the stored magnetic energy of the filter choke 16 maintains current flow through the choke during the time interval $t_1-t_2$ when the input voltage $E_2$ has an instantaneous amplitude smaller than the average output voltage $E_0$. The minimum amount of inductance of the filter choke 16 required to maintain this continuous flow of load current through the choke is given by the relation:

$$L_{min} = \frac{K}{f} R_L \quad (1)$$

where $L_{min}$=minimum value of inductance in henries of the choke 16.

$f$=frequency in cycles per second of the input energizing source connected to terminals 12.

$R_L$=resistance in ohms of the load device 20.

$K$=a constant=0.06 for a full wave, single phase rectifier system.

Figure 2A:
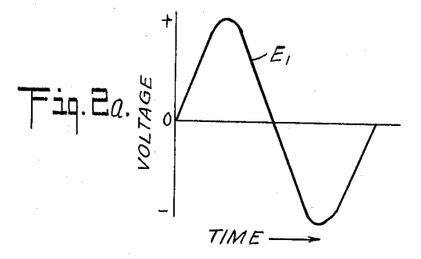
Figure 2B:
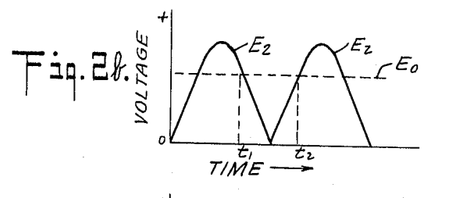
Figure 2C:
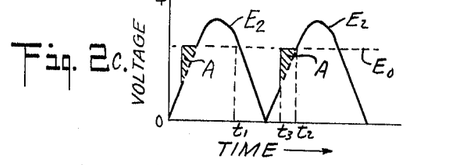
Figure 2D:
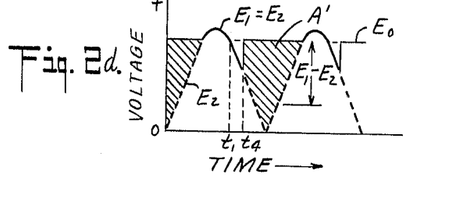

Assume that the filter choke 16 has the minimum value of inductance given by Equation 1, but assume further that the value of resistance of the load device increases to a higher value than that used in computing the minimum value of inductance by use of Equation 1. This increase in the value of resistance of the load device 20 reduces the average value of load current flowing through the filter choke 16. The stored magnetic energy of the latter is now no longer able to maintain a continuous flow of current through the choke 16 during the entire interval $t_1-t_2$ when the output voltage $E_0$ is larger than the instantaneous value of the input voltage $E_2$. The rectifier devices 14 and 15 can conduct current only in one direction toward the output terminal 18 of the power supply system, and accordingly under the conditions last assumed the flow of current through the filter choke 16 will entirely cease at some point in the cycle such as at a time $t_3$. This causes the instantaneous value of the input voltage $E_2$ to the filter network to rise at time $t_3$ to the value of the output voltage $E_0$ as indicated in FIG. 2c, and causes the filter choke input voltage $E_2$ to have an excess volt-second area as indicated by the shaded area A of FIG. 2c. This excess volt-second area energization of the filter network results in an increase of the output voltage $E_0$ in excess of the value which it has for the condition of continuous current conductivity by the filter choke 16. If the resistance of the load device 20 should increase to an even higher value, for example one which reduces the unidirectional load current to a value substantially less than that required to maintain continuous current conductivity through the filter choke 16, the operating condition graphically represented by curve FIG. 2d prevails. Here current flow ceases through the filter choke 16 at a time $t_4$ much earlier in the cycle and a much larger volt-second energization, represented by the shaded area A' of FIG. 2d, of the filter network prevails with the result that the output voltage $E_0$ increases to a value almost equal to the peak amplitude value of the rectifier output voltage $E_2$.

Figure 3:
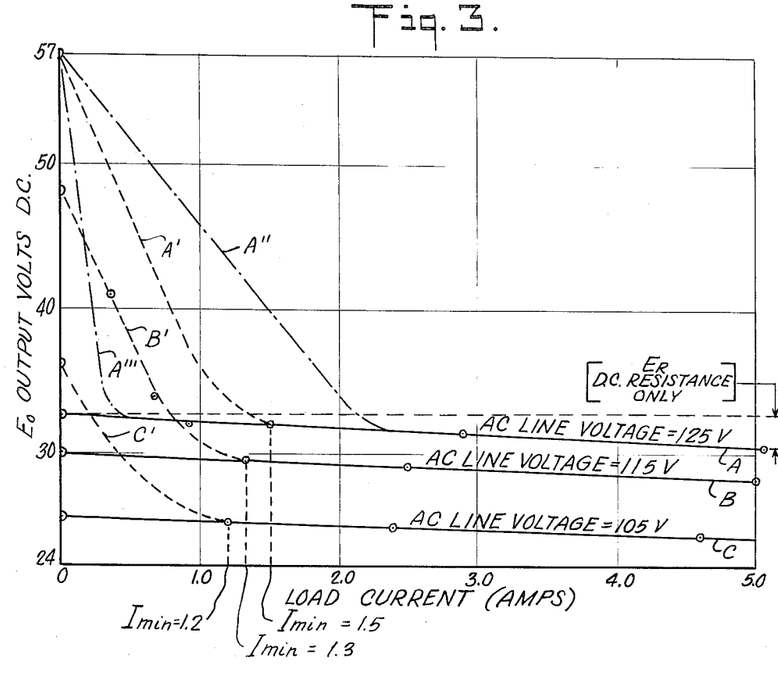

The resultant regulation of the power supply system under the operating conditions last described is graphically shown in FIG. 3 for several values of input energizing voltage applied to the input terminals 12 and as measured in a power supply system having typical values of circuit constants. The solid line curve A as continued by the broken line curve A' represents the voltage regulation of the power supply for an input excitation voltage of 125 volts, the solid line curve B as continued by the broken line curve B' illustrates the voltage regulation characteristic for an excitation voltage of 115 volts, and the solid line curve C as continued by the broken line curve C' indicates the voltage regulation characteristic for an input excitation voltage of 105 volts. It will be noted that the solid line portion of curves A, B and C show a gradual decrease of output voltage $E_0$ with increasing values of load current, the voltage decrease $E_R$ at any selected value of output load current being due to the inherent resistance of the filter choke 16, the internal resistance of the rectifier devices 14 and 15, and the inherent resistance of the transformer secondary winding 13. It will further be noted in connection with the curves A-A', B-B', and C-C' that the output voltage begins to rise sharply whenever the output load current decreases below a minimum current value $I_{min}$, the output voltage $E_0$ of the supply increasing at zero load current to a maximum value approximately 60% higher than its value would be had the regulation characteristic been influenced only by the circuit resistance earlier mentioned. Thus it is evident from the curves of FIG. 3 that the output voltage regulation characteristic of the power supply system thus far considered is very poor over the range from zero value of load current to some minimum value of load current. Curve A as extended by the dot-and-dash curve A" shows the voltage regulation of the power supply system when energized by an input alternating voltage of 125 volts and when using a filter choke having a value of inductance substantially less than that used in attaining the voltage regulation characteristic of curve A'. In similar manner, curve A as extended by the dot-and-dash line curve A''' represents the voltage regulation characteristic under the same conditions but using a filter choke having a very large value of inductance.

Figure 1:
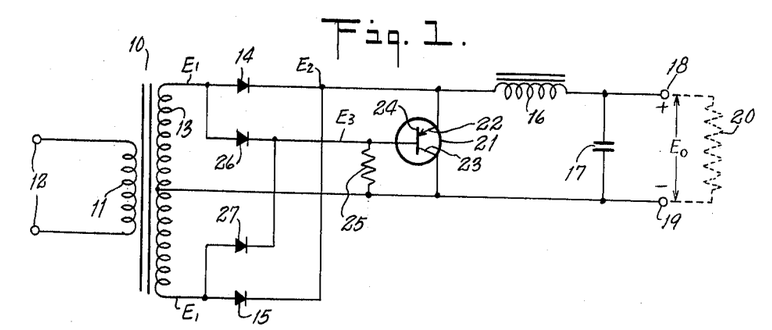
FIG. 1 is a circuit diagram of a unidirectional power supply system embodying the present invention in a particular form, FIGS. 2a–2d and FIG. 3 graphically representing certain operating characteristics of the FIG. 1 system and being used as an aid in explaining its operation.

Consider now the changed character of power supply operation which prevails when the transistor 21 is included in the system as shown in FIG. 1 and earlier described. The rectified devices 26 and 27 develop across the resistor 25 a voltage $E_3$ having the same full-wave rectification waveform and the same instantaneous amplitude as does the voltage $E_2$ as represented by FIG. 2b. This voltage developed across the resistor 25 is applied to the base electrode 24 of the transistor 21 and has such polarity that it maintains the transistor 21 in non-conductive state so long as the instantaneous values of the voltages $E_2$ and $E_3$ are equal. Assume, however, that the output load current decreases below the minimum value required to maintain continuous current flow through the filter choke 16 and thus tends to cause the voltage $E_2$ to rise abruptly as explained in connection with FIGS. 2c and 2d. The base electrode 24 of the transistor 21 now becomes biased to a potential of negative polarity with respect to the emitter electrode 22 and having a value equal to the instantaneous difference between the potentials $E_2$ and $E_3$. This causes the transistor 21 to become conductive and current now flows from the filter condenser 17 through the filter choke 16 in reverse direction and through the transistor 21, whereby the voltage $E_2$ is forced to follow the instantaneous value of the voltage $E_3$. By reason of this, there is no excess volt-second energization of the filter network and no rise in the output voltage $E_0$ as previously described. The resultant output voltage regulation characteristic of the power supply system is now that shown by the solid line curves A, B and C over the full range of output load current from zero value to the full value for which the power supply system is designed. Thus the regulation characteristic is influenced only by the values of resistance of the filter choke 16, the internal resistance of the diode rectifiers 14 and 15, and the resistance of the transformer secondary winding 13 and may be exactly calculated from the known values of resistance of these circuit components.

It will be evident that a unidirectional power supply system embodying the present invention exhibits an excellent voltage regulation characteristic without the need to use a large and expensive filter choke or the need for any terminating shunt-connected resistor as heretofore required to insure a predetermined minimum value of load current flow at all times. The invention in dispensing with the need for the last mentioned resistor likewise avoids the power dissipation created by such resistor with consequent increase of system efficiency. The transistor 21 not only improves the output voltage regulation characteristic over the full range of load currents as just described, but has the further advantage that upon disconnecting the alternating current power supply source from the input terminals 12 the voltage $E_3$ is no longer developed across the resistor 25 and the charge stored in the filter condenser 17 then quickly discharges through the filter choke 16 and the transistor 21 even though the load device 20 is not connected to the output terminals 18, 19 at this time.

Figure 1A:
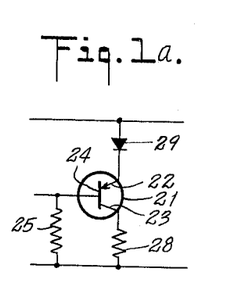
FIG. 1a is a fragmentary circuit diagram representing a modified form of the FIG. 1 power supply system.

The FIG. 1 power supply system may be modified, as indicated by the fragmentary circuit diagram of FIG. 1a, to include a resistor 28 in series with the collector electrode 23 of the transistor 21 if this should be necessary to limit the emitter-collector current of the transistor 21 to a satisfactorily safe value. Also, a diode rectifier 29 may be used in series with the emitter electrode 22 to aid in ensuring a state of complete non-conductivity of the transistor 21 when a preselected value of minimum load current flows through the choke coil 16.

Figure 4:
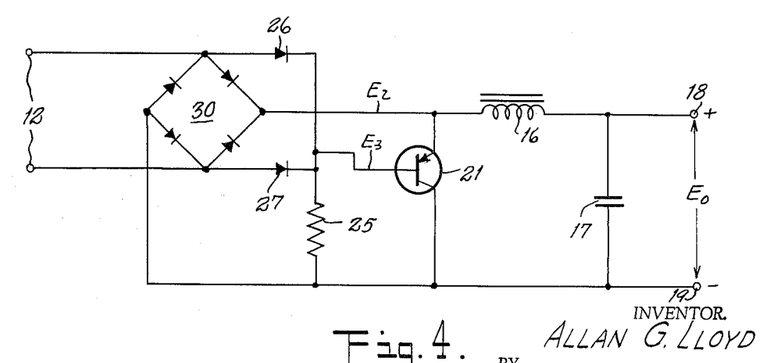
FIG. 4 is a circuit diagram of a power supply system similar to that of FIG. 1 but dispensing with the need for an input energizing transformer.

FIG. 4 is a circuit diagram of a unidirectional power supply system embodying the invention in a form essentially similar to that of FIG. 1, corresponding components being identified by similar reference numerals, except that the rectifier system including the input transformer 10 and rectifier devices 14 and 15 in FIG. 1 is replaced in the FIG. 4 system by a full-wave bridge type of rectifier system 30 of conventional configuration interposed in conventional manner between the input alternating current energizing circuit 12 and the filter network 16, 17. The operation of the FIG. 4 power supply system is the same as that described in connection with FIG. 1, except for the conventional manner of deriving the unidirectional voltage $E_2$, and accordingly will not be repeated.

Figure 5:
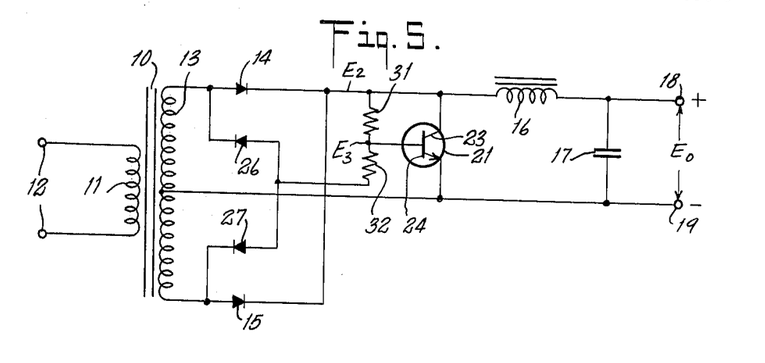
FIGS. 5 and 6 are circuit diagrams of power supply systems also similar to the FIG. 1 arrangement but providing regulation control by use of different forms of control devices.

Whereas the power supply systems of FIGS. 1 and 4 are shown as utilizing a PNP type of voltage regulation control transistor 21, FIG. 5 shows the circuit arrangement of a similar power supply system utilizing an NPN control transistor 21. Here a full-wave rectification bias voltage for the base electrode 24, having negative polarity with respect to the collector electrode 23, is provided by connecting the base electrode to the junction of series voltage divider resistors 31 and 32 connected between the junction of the diode rectifier devices 14 and 15 and the junction of the diode rectifier devices 26 and 27 which have opposite conductive polarities to the corresponding devices of FIG. 1. The resulting operation is that previously described, the transistor 21 being biased to its non-conductive state for any value of load current in excess of a preselected minimum value.

Figure 6:
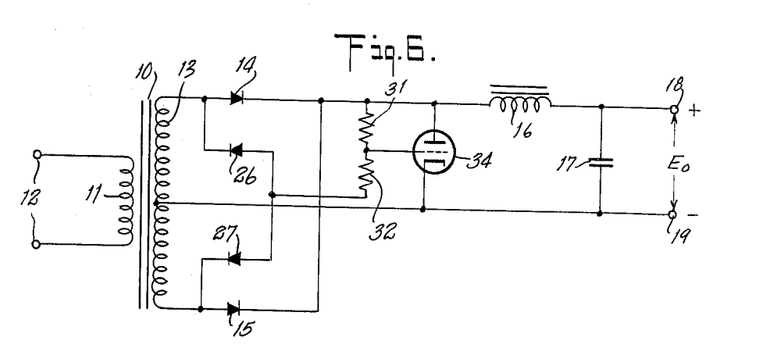

An NPN type of transistor is quite analogous in its manner of application to the triode form of conventional vacuum tube. It will accordingly be evident that a triode control tube may be substituted for the transistor 21 of FIG. 5 to provide, as in FIG. 6, a power supply system in which the anode and cathode of a triode vacuum tube 34 are connected across the input of the filter network and the control grid of the tube is connected to the junction of the voltage divider resistors 31 and 32 having values selected to maintain the tube 34 in non-conductive state for any value of load current in excess of a preselected minimum value. The operation of the FIG. 6 form of the invention otherwise is the same as that of FIG. 5.

Figure 7:
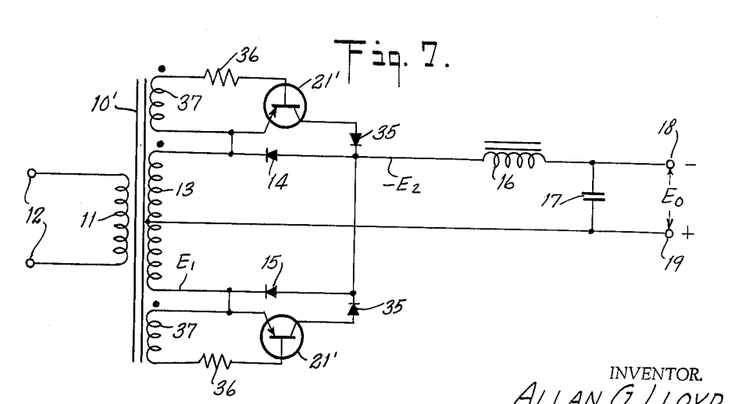
FIGS. 7, 8 and 9 are circuit diagrams of unidirectional power supply systems embodying the present invention in several forms effective to maintain regulation by returning energy to the alternating current energizing source over a range of minimum load currents.

The power supply systems thus far considered have the voltage regulation control device connected in shunt to the input of the filter network and dynamically biased to non-conductive state whenever unidirectional load current in excess of a minimum value flows in one direction through the filter choke but becoming instantaneously conductive to permit reverse current flow through the choke whenever the instantaneous value of load current is less than such minimum value. FIG. 7 is a circuit diagram of a unidirectional power supply system embodying the invention in a form which accomplishes the same result by use of voltage regulation control devices connected to conduct the reverse current of the filter choke around the load current rectifier devices. Circuit components in FIG. 7 which correspond to the same components in the systems heretofore described are designated by similar reference numerals and analogous components by similar reference numerals primed. The present system is shown by way of example as having the load current rectifier devices 14 and 15 polarized to develop a negative unidirectional output potential $-E_0$. The voltage regulation control transistors 21' are of the PNP type, and have their emitter and collector electrodes coupled as shown through diode rectifier devices 35 in shunt to each of the rectifier devices 14 and 15 and their emitter and base electrodes energized by alternating voltages supplied through current limiting resistors 36 from windings 37 provided on the input power transformer 10'. As indicated by the polarity dots applied to the several transformer windings, the windings 37 bias their associated transistors 21' to their conductive and non-conductive states during the intervals when the associated rectifier device 14 or 15 is likewise respectively conducting or non-conducting. The rectifier devices 35 prevent the application of reverse emitter-collector voltage to their associated transistor 21' and may be omitted in low power applications.

The operation of the FIG. 7 power supply system is similar to that previously described. For any value of load current in excess of a preselected minimum value, the direction of current flow through the filter choke 16 is from the terminal 18 to the rectifier devices 14 and 15. For lesser values of load current, however, current flow in this direction through the choke 16 will cease at some point in each half cycle of the energizing potential supplied to the input terminals 12 as explained above in connection with FIG. 1. During the remainder of the half cycle in which the instantaneous value of the voltage $-E_2$ is less than that of the corresponding half cycle of the voltage $E_1$, the corresponding one of the transistors 21' is rendered conductive to permit current flow in reverse direction through the choke 16 from the condenser 17. In particular, this current flow is from the positive terminal of the condenser 17, through one half of the transformer secondary winding 13, from emitter electrode to collector electrode of the conductive one of the transistors 21', through the associated one of the diode rectifier devices 35, and through the choke 16 to the negative terminal of the condenser 17. Accordingly, the instantaneous value of the voltage $-E_2$ is forced to follow that of the corresponding half cycle of the voltage $E_1$. No excess volt-second energization of the filter network is therefore possible for load current values less than the preselected minimum value, and the voltage regulation characteristic of the power supply system is accordingly independent of the value of inductance of the filter choke 16 and is affected only by the component resistances as previously explained in connection with FIG. 1. Also as in the latter arrangement, the transistors 21' quickly discharge the filter condenser 17 when input alternating current energization is removed from the system. This rapid discharge character of operation will be evident when it is considered that the initial discharge current flowing through one half of the transformer secondary winding 13 and one of the transistors 21' will cause a voltage to be developed in the transformer windings 37 with such polarity as to render the conductive transistor 21' even more conductive and thus accelerate the rate of discharge. Current flowing alternately through the two halves of the transformer winding 13 during the intervals of reverse current flow through the filter choke 16 returns energy to the energizing source, not shown, connected to the input terminals 12.

Figure 8:
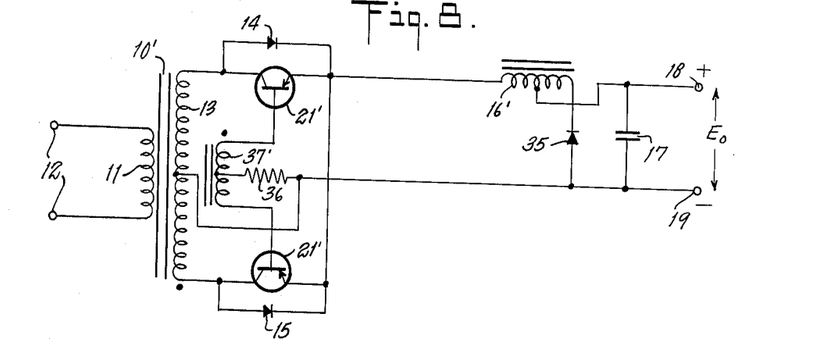

FIG. 8 is a circuit diagram of a power supply system embodying the invention in a form essentially similar to that of FIG. 7 except that the load current rectifier devices 14 and 15 are shown as connected with such polarities as to develop a positive unidirectional output voltage $E_0$, and a common bias winding 37' on the transformer 10' has its end terminals connected to the base electrodes of the control resistors 21' and has a center tap connected through a common current limiting resistor 36 to the center tap of the transformer secondary winding 13. The winding of the filter choke 16' in the present arrangement is extended and is connected to the diode rectifier 35 as shown, the latter being common to the transistors 21' and serving as in the FIG. 7 system to prevent the application of a reverse voltage to the transistors when both are non-conductive under reverse current. The operation of the FIG. 8 power supply system is otherwise similar to that of FIG. 7.

Figure 9:
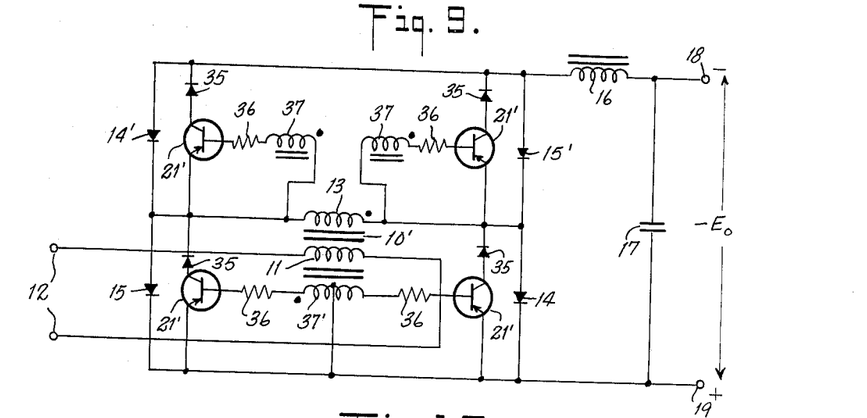

A power supply system also similar to that of FIG. 7, but using a bridge rectifier configuration, is shown in FIG. 9. Here the transformer secondary winding 13 energizes the bridge-connected load-current diode rectifier devices 14, 14', 15 and 15' shown as having such polarities as to develop a negative unidirectional output voltage $-E_0$. Control transistors 21' are connected across each of these load-current rectifier devices, and the conductive and non-conductive states of the transistors are controlled by transformer windings 37 and 37' as described in connection with FIGS. 7 and 8. The operation of the FIG. 9 form of power supply system is otherwise essentially similar to that described in connection with FIG. 7.

Figure 10:
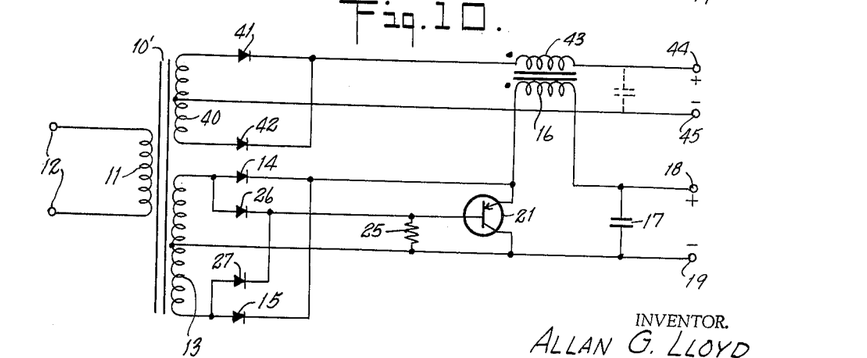
FIG. 10 is a circuit diagram of a unidirectional power supply system embodying the present invention in a form wherein regulation is concurrently effected in two electrically independent power supply systems over the full range of load currents of each from full load to zero load.

FIG. 10 is a circuit diagram of a power supply system utilizing the present invention in the form shown in FIG. 1, corresponding circuit components being identified by similar reference numerals, but providing two electrically independent sources of unidirectional energy with a common inductive-input ripple filter of the type disclosed in applicant's copending application Serial No. 103,889, filed April 18, 1961, and assigned to the same assignee as the present application. To provide a second source of unidirectional energy, in addition to that provided by the FIG. 1 form of power supply source, the input power transformer 10 includes a center-tapped secondary winding 40. The end terminals of the latter are connected for full-wave rectification through a pair of diode rectifier devices 41 and 42 and an input filter choke winding 43 to the positive polarity unidirectional output terminal 44. The center tap of the secondary winding 40 is connected to the negative polarity output terminal 45 as shown, and in conformity with the teachings of the aforesaid copending application the filter winding 43 is wound upon the same magnetic core as the filter winding 16 and is closely inductively coupled to the latter. For reasons pointed out more fully in the copending application, the close inductive coupling of the filter windings 16 and 43 and the polarities with which they are connected in their individual power supply circuits as conventionally indicated in FIG. 10 by the polarity dots associated with these windings causes the same percentage value of ripple voltage to be maintained in both output circuits 18, 19 and 44, 45 in the same manner as though the filter condenser 17 were included in the output circuit 44, 45 as indicated in broken lines. It is explained in the copending application that the flow of a preselected minimum value of load current in one output circuit, as required to maintain continuous current flow through the filter inductor of that output circuit for the entire period of each half cycle of the input energizing alternating current, causes the other output circuit to exhibit an excellent voltage regulation characteristic over the full range of its load current from zero value to full rated output value. However, in the FIG. 10 power supply system and for reasons pointed out above in connection with FIG. 1, the input shunt-connected control transistor 21 operates to maintain an excellent voltage regulation characteristic in the output circuit 18, 19 without need for any minimum value of load current flow therein and it has been found that the control transistor 21 likewise maintains excellent voltage regulation in the output circuit 44, 45 also without need of any minimum current flow in this output circuit.

It will be apparent from the foregoing description of the invention that a unidirectional power supply system embodying the invention exhibits the excellent regulation characteristic of the inductance-input type of filter network over the full range of load currents from zero load current to maximum rated load current supply by the system, thus dispensing with any requirement that a minimum value of load current flow to avoid an undesirable rise of the output voltage to a value in excess of the average value of alternating voltage rectified. A power supply system embodying the present invention has the further advantage that the excellent regulation characteristic of the system may be readily and precisely calculated during design of the system since the characteristic is determined, for all values of load current including zero value of load current, almost entirely by the effective resistance and leakage inductance of the input power transformer together with the rectifier conductive resistance and the resistance of the filter inductor or inductors used. The invention has the further important advantage that it minimizes undesirable power loss and thus results in enhancing the efficiency of operation of a unidirectional power supply system and, for certain forms of the invention, even further improves the efficiency of operation for low values of load current by returning energy to the input alternating current energy source as explained in connection with these forms of the invention.

While specific forms of invention have been described for purposes of illustration, it is contemplated that numerous changes may be made without departing from the spirit of the invention.

What is claimed is:

1. A unidirectional power supply system comprising means adapted to be energized from an alternating current source to derive therefrom unidirectional energy having a unidirectional voltage of full-wave rectification waveform, a filter network energized by said means and including an input series inductor having a preselected relatively constant value of inductance normally effective for load current in excess of a preselected minimum value to maintain a continuous instantaneous supply of unidirectional load current to a filter-network output load circuit including the supply of charging current to a fiber condenser connected in shunt to said output circuit, conductance control means effectively coupling said inductor and condenser in series relation to abstract energy from said condenser through said inductor and conductance-control means, and means for conductively controlling said conductance-control means jointly by a voltage of half-wave sinusoidal waveform essentially in phase with said voltage of fullwave rectification waveform and by the instantaneous voltage appearing at the input of said inductor to render said conductance control means conductive throughout each interval of any cessation of current flow through said filter inductor to said output circuit.

2. A unidirectional power supply system comprising means adapted to be energized from an alternating current source to derive therefrom unidirectional energy having a unidirectional voltage of full-wave rectification waveform, a filter network energized by said means and including an input series inductor having a preselected relatively constant value of inductance normally effective for load current in excess of a preselected minimum value to maintain a continuous instantaneous supply of unidirectional load current to a filter-network output load circuit including the supply of charging current to a filter condenser connected in shunt to said output circuit, conductance control means having conductance-control terminals and having conductance terminals connecting said inductor and condenser in series relation and effective upon becoming conductive to discharge said condenser through said inductor, and means for supplying to said conductance-control terminals during each half cycle of said source and essentially in phase therewith electrical energy of essentially sinusoidal waveform to control the instantaneous conductance of said conductance-control and render said conductance terminals thereof conductive throughout each interval of any cessation of current flow through said filter inductor to said output circuit.

3. A unidirectional power supply system comprising means adapted to be energized from an alternating current source to derive therefrom unidirectional energy having a unidirectional voltage of full-wave rectification waveform, a filter network energized by said means and including an input series inductor having a preselected relatively constant value of inductance normally effective for load current in excess of a preselected minimum value to maintain a continuous instantaneous supply of unidirectional load current to a filter-network output load circuit including the supply of charging current to a filter condenser connected in shunt to said output circuit, at least one conductance control device having conductance control terminals and having current conductance terminals effectively coupling said inductor and condenser in series relation to abstract energy from said condenser through said inductor, and means for supplying to said conductance control terminals of each said device a voltage of half-wave sinusoidal waveform essentially in phase with said voltage of full-wave rectification waveform to render the conductance terminals of at least one said device conductive throughout any interval of each half cycle of said alternating current source when there is cessation of current flow through said filter inductor to said output circuit.

4. A unidirectional power supply system comprising means adapted to be energized from an alternating current source and including a pair of rectifier devices alternately conducting current of said source to derive therefrom unidirectional energy having a unidirectional voltage of full-wave rectification waveform, a fillter network energized by said means and including an input series inductor having a preselected relatively constant value of inductance normally effective for load current in excess of a preselected minimum value to maintain a continuous instantaneous supply of unidirectional load current to a filter-network output load circuit including the supply of charging current to a filter condenser connected in shunt to said output circuit, a pair of unidirectionally conductive conductance control devices each effectively coupled in shunt to an individual one of asid rectifier devices with a direction of conductivity opposed thereto for coupling said inductor and condenser in series relation through at least one conductive circuit of said means to abstract energy from said condenser through said inductor, and means for rendering said conductance control devices alternately conductive throughout any interval of successive half cycles of said alternating current source when there is cessation of current flow through said filter inductor to said output circuit.

5. A unidirectional power supply system comprising means adapted to be energized from an alternating current source to derive therefrom unidirectional energy having a unidirectional voltage of full-wave rectification waveform, a filter network energized by said means and including an input series inductor having a preselected relatively constant value of inductance normally effective for load current in excess of a preselected minimum value to maintain a continuous instantaneous supply of unidirectional load current to a filter-network output load circuit including the supply of charging current to a filter condenser connected in shunt to said output circuit, and means responsive jointly to the input terminal voltage of said network and to a voltage corresponding to said unidirectional voltage of full-wave rectification waveform for abstracting current from said condenser through said inductor throughout each interval of any cessation of current flow through said inductor to said output circuit to maintain the instantaneous voltage applied to said filter network substantially of said full-wave rectification waveform.

6. A unidirectional power supply system comprising means providing power and control output circuits and adapted to be energized from an alternating current source to derive therefrom and in each said output circuit unidirectional energy having a unidirectional voltage of full-wave rectification waveform, a filter network energized from said power output circuit and including an input series inductor having a preselected relatively constant value of inductance normally effective for load current in excess of a preselected minimum value to maintain a continuous instantaneous supply of unidirectional load current to a filter-network output load circuit inclding the supply of charging current to a filter condenser connected in shunt to said filter output circuit, and means responsive jointly to the voltages in said power and control output circuits for abstracting current from said condenser through said inductor throughout each interval of any cessation of current flow through said inductor to said filter output circuit to maintain the instantaneous voltage applied to said filter network substantially of said full-wave rectification waveform.

7. A unidirectional power supply system comprising means providing power and control output circuits and adapted to be energized from an alternating current source to drive therefrom and in each said output circuit directional energy having a unidirectional voltage of full-wave rectification waveform, a filter network energized from said power output circuit and including an input series indicator having a preseltced relatively constant value of inductance normally effective for load current in excess of a preselected minimum value to maintain a continuous instantaneous supply of unidirectional load current to a filter-network output load circuit inclding the supply of charging current to a filter condenser connected in shunt to said filter output circuit, and a transistor having emitter-collector electrodes coupled in shunt to said power output circuit and emitter-base electrodes jointly biased by the unidirectional voltages of said power and control output circuits to abstract energy from said condenser through said inductor throughout each interval of any cessation of current flow through said filter inductor to said filter output circuit.

8. A unidirectional power supply system comprising means providing power and control output circuits and adapted to be energized from an alternating current source to derive in said output circuits unidirectional energy having in said circuits relative in phase unidirectional voltages of full-wave rectification waveforms, a filter network energized from said power output circuit and including an input series inductor having a preselected relatively constant value of inductance normally effective for load current in excess of a preselected minimum value to maintain a continuous instantaneous supply of unidirectional load current to a filter-network output load circuit including the supply of charging current to a filter condenser connected in shunt to said filter output circuit, and a transistor having emitter-collector electrodes coupled in shunt to said power output circuit and emitter-base electrodes coupled between said power and control output circuits to abstract energy from said condenser through said inductor throughout each interval of any cessation of current flow through said filter inductor to said filter output circuit.

9. A unidirectional power supply system comprising a first full-wave rectifier system adapted to be energized from an alternating current source and providing a power output circuit supplying unidirectional energy having a unidirectional voltage of full-wave rectification waveform, a second full-wave rectifier system adapted to be energized from said source and providing a control output circuit in which there is derived a unidirectional voltage of full-wave rectification waveform, a filter network energized by said power output circuit and including an input series inductor having a preselected relatively constant value of inductance normally effective for load current in excess of a preselected minimum value to maintain a continuous instantaneous supply of unidirectional load current to an output load circuit including the supply of charging current to a filter condenser connected in shunt to said output load circuit, and a transistor having emitter collector electrodes coupled across said power output circuit and emitter-base electrodes energized jointly by said power and control output circuits to effect discharge of said condenser through said inductor throughout any interval when there is cessation of current flow through said filter inductor to said output load circuit.

10. A unidirectional power supply system comprising means providing power and control output circuits and adapted to be energized from an alternating current source to derive therefrom and in each said output circuit unidirectional energy having a unidirectional voltage of full-wave rectification waveform, a filter network energized from said power output circuit and including an input series inductor having a preselected relatively constant value of inductance normally effective for load current in excess of a preselected minimum value to maintain a continuous instantaneous supply of unidirectional load current to a filter-network output load circuit including the supply of charging current to a filter condenser connected in shunt to said filter output circuit, and a conductance control device having current-conductive terminals coupled across said power output circuit and conductance-control terminals energized by the unidirectional voltages of said power and control output circuits to abstract current from said condenser through said inductor throughout each interval of any cessation of current flow through said inductor to said output circuit to maintain the instantaneous voltage applied to said filter network substantially of said full-wave rectification waveform.

11. A unidirectional power supply system comprising a transformer adapter to be energized from an alternating current source and including a secondary winding coupled to a pair of unidirectionally conductive paths alternately conductive during successive half cycles of said source to derive therefrom unidirectional energy having a unidirectional voltage of full-wave rectification waveform, a filter network energized by said unidirectional energy and including an input series inductor having a preselected relatively constant value of inductance normally effective for load current in excess of a preselected minimum value to maintain a continuous instantaneous supply of unidirectional load current to an output load circuit including the supply of charging current to a filter condenser connected in shunt to said output circuit, a pair of unidirectionally conductive devices having conductance electrodes coupled across individual ones of said paths but in reverse direction of conductivity with respect thereto, and means for rendering said devices alternately conductive throughout any interval of said successive half cycles when there is cessation of current flow through said filter inductor to said output circuit for producing current from said condenser through said inductor to maintain the instantaneous voltage applied to said filter network substantially of said full-wave rectification waveform.

12. A unidirectional power supply system comprising a transformer adapted to be energized from an alternating current source and including a secondary winding coupled to at least one pair of alternately conductive rectifier devices to derive unidirectional energy having a unidirectional voltage of full-wave rectification waveform, a filter network energized by said unidirectional energy and including an input series inductor having a preselected relatively constant value of inductance normally effective for load current in excess of a preselected minimum value to maintain a continuous instantaneous supply of unidirectional load current to an output load circuit including the supply of charging current to a filter condenser connected in shunt to said output circuit, and means including a unidirectional conductance control device coupled across each of said rectifier devices with opposite polarity of conduction thereto and conditioned to be rendered conductive concurrently therewith for abstracting energy from said condenser through said inductor and transformer winding throughout any interval of each half cycle of said alternating current source when there is cessation of current flow through said filter inductor to said output circuit.

13. A unidirectional power supply system comprising a transformer adapted to be energized from an alternating current source and including a secondary winding coupled to a pair of alternately conductive rectifier devices to derive unidirectional energy having a unidirectional voltage of full-wave rectification waveform, a filter network energized by said unidirectional energy and including an input series inductor having a preselected relatively constant value of inductance normally effective for load current in excess of a preselected minimum value to maintain a continuous instantaneous supply of unidirectional load current to an output load circuit including the supply of charging current to a filter condenser connected in shunt to said output circuit, and a pair of unidirectional conductance control devices coupled across individual ones of said rectifier devices with opposite polarities of conduction thereto and alternately conditioned to be rendered conductive during successive half cycles of said source to abstract energy from said condenser through said inductor and transformer winding throughout any interval of each of said successive half cycles when there is cessation of current flow through said filter inductor to said output circuit.

14. A unidirectional power supply system comprising a transformer adapted to be energized from an alternating current source and including a plurality of control windings and a secondary winding coupled to at least one pair of alternately conductive rectifier devices to derive unidirectional energy having a unidirectional voltage of full-wave rectification waveform, a filter network energized by said unidirectional energy and including an input series inductor having a preselected relatively constant value of inductance normally effective for load current in excess of a preselected minimum value to maintain a continuous instantaneous supply of unidirectional load current to an output load circuit including the supply of charging current to a filter condenser connected in shunt to said output circuit, and a plurality of transistors having emitter-collector electrodes coupled across individual ones of said rectifier devices with opposite polarity of conduction thereto and having emitter-base electrodes energized by individual ones of said transformer control windings to condition each transistor to be rendered conductive concurrently with the rectifier device across which it is coupled and thereby abstract energy from said condenser through said inductor and transformer secondary winding throughout any interval of each half cycle of said alternating current source when there is cessation of current flow through said filter inductor to said output circuit.

15. A unidirectional power supply system comprising a transformer adapted to be energized from an alternating current source and including a pair of control windings and a secondary winding coupled to a pair of alternately conductive rectifier devices to derive unidirectional energy having a unidirectional voltage of full-wave rectification waveform, a filter network energized by said unidirectional energy and including an input series inductor having a preselected relatively constant value of inductance normally effective for load current in excess of a preselected minimum value to maintain a continuous instantaneous supply of unidirectional load current to an output load circuit including the supply of charging current to a filter condenser connected in shunt to said output circuit, and a pair of transistors having emitter-collector electrodes coupled across individual ones of said rectifier devices with opposite polarity of conduction thereto and having emitter-base electrodes energized by individual ones of said transformer control windings to condition each said transistor to be rendered conductive concurrently with the rectifier device across which it is coupled and thereby abstract energy from said condenser through said inductor and transformer secondary winding throughout any interval of each half cycle of said alternating current source when there is cessation of current flow through said filter inductor to said output circuit.

16. A unidirectional power supply system comprising a transformer adapted to be energized from an alternating current source and including a plurality of control winding portions and a secondary winding coupled to a bridge rectifier having at least two pairs of rectifier devices to derive in a power output circuit unidirectional energy having a unidirectional voltage of full-wave rectification waveform, a filter network energized from said power output circuit and including an input series inductor having a preselected relatively constant value of inductance normally effective for load current in excess of a preselected minimum value to maintain a continuous instantaneous supply of unidirectional load current to a filter output load circuit including the supply of charging current to a filter condenser connected in shunt to said filter output circuit, and a plurality of transistors having emitter-collector electrodes coupled across individual ones of said rectifier devices with opposite polarity of conduction thereto and having emitter-base electrodes energized by individual ones of said transformer control winding portions to condition each said transistor to be rendered conductive concurrently with the rectifier device across which it is coupled and thereby abstract energy from said condenser through said inductor and transformer secondary winding throughout any interval of each half cycle of said alternating current source when there is cessation of current flow through said filter inductor to said filter output circuit.

17. A unidirectional power supply system comprising means adapted to be energized from an alternating current source to derive therefrom unidirectional energy having a unidirectional voltage of full-wave rectification waveform, a filter network energized by said means and including an input series inductor having a preselected relatively constant value of inductance normally effective for load current in excess of a preselected minimum value to maintain a continuous instantaneous supply of unidirectional load current to a filter-network output load circuit including the supply of charging current to a filter condenser connected in shunt to said output circuit, conductance-control means having conductance-control terminals and having conductance terminals electrically connecting said inductor and condenser in a series condenser-discharge electrical circuit in which any charge in said condenser may be discharged through said inductor and said conductance terminals under conductive control of said conductance-control terminals, and means for supplying to said conductance-control terminals during each half cycle of said source and essentially in phase therewith electrical energy having essentially sinusoidal waveform and an amplitude selected so to control the instantaneous conductance of said conductance-control means as to maintain the instantaneous voltage applied to said filter network substantially of said full-wave rectification waveform for values of load current less than said preselected minimum value.

18. A unidirectional power supply system comprising a full-wave rectifier system adapted to be energized from an alternating current source to derive therefrom unidirectional energy having a unidirectional voltage of full-wave rectification waveform, a filter network energized by said rectifier system and including an input series inductor having a preselected relatively constant value of inductance normally effective for load current in excess of a preselected minimum value to maintain a continuous instantaneous supply of unidirectional load current to a filter-network output load circuit including the supply of charging current to a filter condenser connected in shunt to said output circuit, conductance-control means having conductance-control terminals and having conductance terminals electrically connecting said inductor and condenser in a series condenser-discharge electrical circuit in which any charge in said condenser may be discharged through said inductor and said conductance terminals under conductive control of said conductance-control terminals, and means for energizing said conductance-control terminals by a voltage proportional to the instantaneous voltage difference between said voltage of full-wave rectification waveform and the voltage appearing at the input of said inductor to maintain the instantaneous voltage applied to said filter network substantially of said full-wave rectification waveform for values of load current less than said preselected minimum value.

References Cited by the Examiner
UNITED STATES PATENTS

| | | | |
|---|---|---|---|
| 3,022,454 | 2/1962 | Millis | 323—22 X |
| 3,034,037 | 5/1962 | Heightman | 320—1 |
| 3,156,860 | 11/1964 | Paynter | 323—22 X |

LLOYD McCOLLUM, *Primary Examiner.*

MAX L. LEVY, *Examiner.*

G. C. BUDOCK, J. C. SQUILLARO,
*Assistant Examiners.*